(12) United States Patent
Kikuchi et al.

(10) Patent No.: US 6,554,385 B2  
(45) Date of Patent: Apr. 29, 2003

(54) COLOR IMAGE GENERATION APPARATUS AND COLOR IMAGE GENERATION METHOD

(75) Inventors: Noriyuki Kikuchi, Mishima (JP); Hiroki Umezawa, Shizuoka-ken (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/805,355

(22) Filed: Mar. 13, 2001

(65) Prior Publication Data  
US 2001/0030670 A1 Oct. 18, 2001

(30) Foreign Application Priority Data  
Mar. 17, 2000 (JP) ........................... 2000-076973  
Jan. 17, 2001 (JP) ........................... 2001-009291

(51) Int. Cl.$^7$ ........................ B41J 2/205; B41J 29/393  
(52) U.S. Cl. ......................... 347/15; 347/19  
(58) Field of Search ..................... 347/43, 15, 40, 347/19; 358/1.1, 1.9

(56) References Cited

U.S. PATENT DOCUMENTS 4,631,548 A * 12/1986 Milbrandt ............... 347/43  
5,997,132 A    12/1999 Smith et al.

FOREIGN PATENT DOCUMENTS

JP   60-187553   9/1985  
JP   1-228376    9/1989

* cited by examiner

*Primary Examiner*—Thinh Nguyen  
(74) *Attorney, Agent, or Firm*—Frishauf, Holtz, Goodman & Chick, P.C.

(57) ABSTRACT

A process computes a combination of chromatic and achromatic color dots for reproducing an input color signal based on a result of colorimetric measurement for a CIELab value. The process finds the sum of chromatic and achromatic color dot diameters. The process extracts combinations of chromatic and achromatic color dots wherein the sum of chromatic and achromatic color dot diameters is greater than or equal to a specified value. From the extracted combinations of chromatic and achromatic color dots, the process further extracts chromatic and achromatic color signals for recording a combination of chromatic and achromatic color dots containing the minimum achromatic color dot diameter and determines these signals as a color signal.

9 Claims, 12 Drawing Sheets

DOT 1  DOT 2  DOT 3  DOT 4  DOT 5  DOT 6  DOT 7

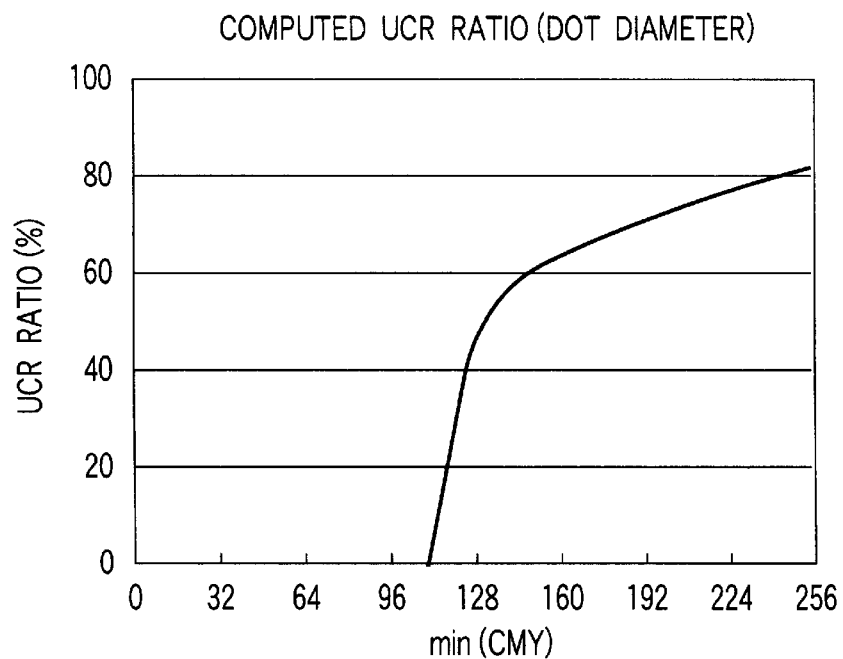
F I G. 15
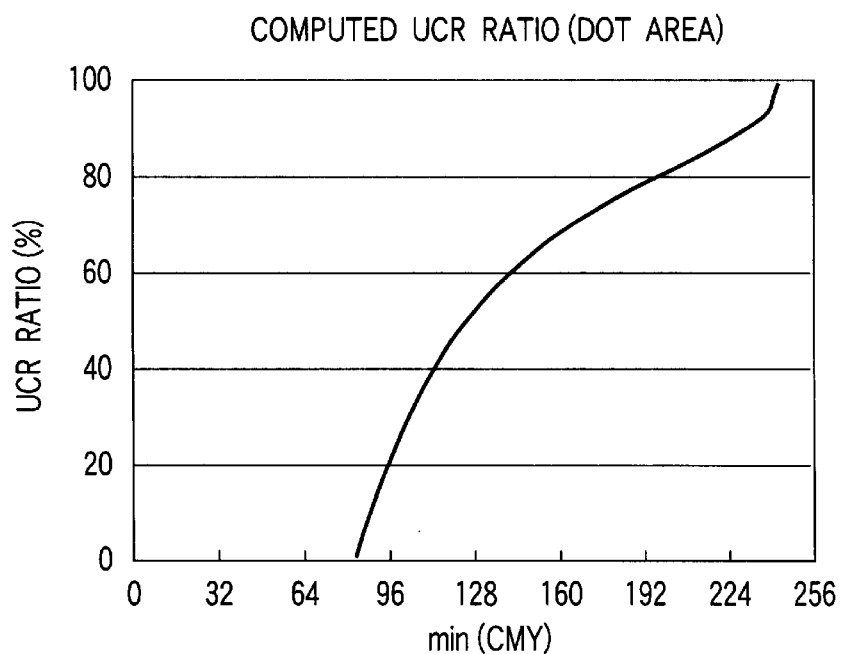
F I G. 16

COLOR IMAGE GENERATION APPARATUS AND COLOR IMAGE GENERATION METHOD

CROSS-REFERENCE TO RELATED APPLICATIONS

This application is based upon and claims the benefit of priority from the prior Japanese Patent Applications No. 2000-076973, filed Mar. 17, 2000; and No. 2001-009291, filed Jan. 17, 2001, the entire contents of both of which are incorporated herein by reference.

BACKGROUND OF THE INVENTION

1. Field of the Invention

The present invention relates to a color image generation apparatus and a color image generation method for recording dots of chromatic and achromatic colors and expressing the gradation and forming an image by varying dot sizes of chromatic and achromatic colors.

2. Description of the Related Art

A color image generation apparatus is provided with a plurality of heads for recording chromatic color dots such as C (Cyan), M (Magenta), and Y (Yellow), and achromatic color dots such as K (Black). The color image generation apparatus uses these heads to generate an image by recording chromatic and achromatic color dots on a recording medium.

Unlike monochrome image recording such as character-only recording, the color image generation apparatus recording color images requires various factors such as colorimetric characteristic, tone reproduction characteristic, uniformity of color, and the like.

Especially, the uniformity of color depends on various reasons such as inconsistent nozzle accuracies resulting from a manufacturing process, relative misalignment between recording heads environmental condition changes during recording, and the like.

Ultimately, positional inaccuracy for recording dots degrades the uniformity of color, namely causes a color change.

The color image generation apparatus which expresses intended gradation by varying dot sizes very often generates an image by recording small dots particularly at a highlight portion, namely a region with high brightness. This means that a void region often occurs between adjacent pixels.

The frequency of color changes remarkably increases when recording positions for respective color dots are misaligned for some reason and a different color dot is recorded at the void region.

For example, Jpn. Pat. Appln. KOKAI Publication No. 1-228376 discloses a gradation expression method for suppressing occurrence of such a color change. According to this disclosure, a proper gradation level is specified as a threshold value. The gradation is formed by performing the 100 UCR (under color removal) in a low gradation region below the threshold value. In addition, the pixel gradation is formed by performing the UCR at a decreasing ratio in proportion to a gradation increase in a high gradation region above the threshold value.

This gradation expression method is used for, say, an ink-jet color printer. In this case, the threshold value is set to a gradation level near the boundary where a color change is inconspicuous visually. A region is divided into two portions at the specified threshold used as a boundary.

The 100% UCR is performed in the low gradation region below the specified threshold value. The gradation is expressed with the small number of ink colors, making a color change inconspicuous on a color image. Achromatic color ink such as black is used for forming an image having achromatic color gradation in the low gradation region, providing a color image free from a color change.

When an image is formed in the high gradation region above the specified threshold value, the UCR is performed at a decreasing ratio in proportion to a gradation increase. A color image in the high gradation region yields a final density by repeating the highest one of densities formed by achromatic color ink such as black. Accordingly, such a color image is formed with the smooth, natural tone reproduction characteristic and many gradations.

When the 100% UCR is performed in the low gradation region with a conspicuous color change, the image is apparently formed of the smaller number of colors than usual. However, forming an image with the smaller number of colors than usual does not directly decrease occurrence of color changes. Rather, a combination of chromatic and achromatic colors may cause a more remarkable color change.

No chromatic color is recorded when the 100% UCR is performed in an achromatic color region with the low gradation during image formation. Since only the achromatic color is recorded, no color change occurs, but the granularity degrades.

BRIEF SUMMARY OF THE INVENTION

It is an object of the present invention to decrease such color changes as described above, by using image processing means.

When chromatic and achromatic color dots are recorded at almost the same position, the present invention includes image processing means for converting and reproducing an input color signal and processing the signal so that the sum of dot diameters becomes greater than or equal to a preset specified value.

When chromatic and achromatic color dots are recorded at almost the same position, the present invention includes image processing means for converting and reproducing an input color signal and processing the signal so that the sum of dot areas becomes greater than or equal to a preset specified value.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 15 shows a UCR rate computed from the sum of dot diameters according to the embodiment;

FIG. 16 shows a UCR rate computed from the sum of dot areas according to the embodiment;

DETAILED DESCRIPTION OF THE INVENTION

Figure 1:
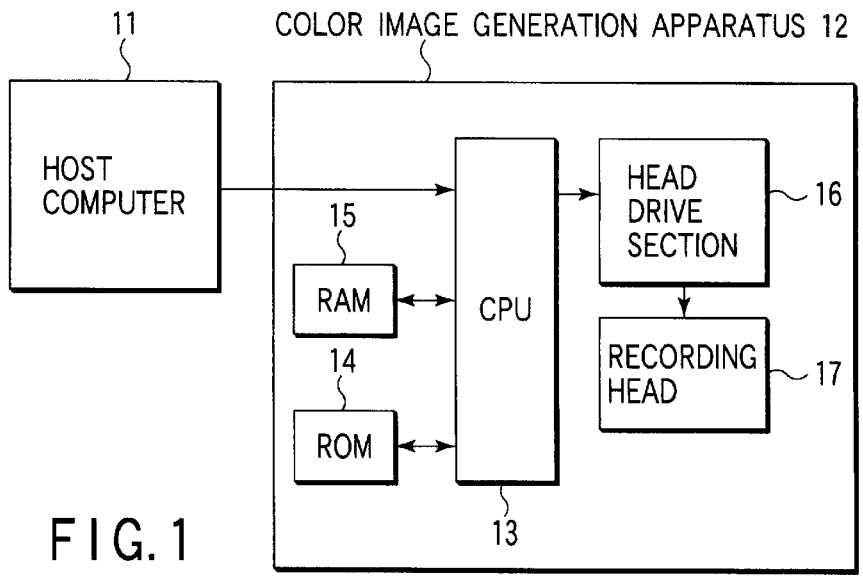
FIG. 1 is a block diagram showing a system according to an embodiment of the present invention, comprising a host computer and a color image generation apparatus.

A system in FIG. 1 comprises a host computer 11 and a color image generation apparatus 12 which are connected by a transmission cable. The host computer 11 transfers image data to the color image generation apparatus 12.

The color image generation apparatus 12 comprises a Central Processing Unit (CPU) 13, Read Only Memory (ROM) 14, Random Access Memory (RAM) 15, a head drive section 16, a recording head 17, and the like. The ROM 14 stores an image processing program. The RAM 15 temporarily stores a work area for the CPU 13 and image data. The recording head 17 is driven by the head drive section 16 and records images on a recording medium.

When image data is transferred from the host computer 11 to the color image generation apparatus 12, this image data is temporarily stored in the RAM 15. The image data stored in the RAM 15 is read by the CPU 13 for specified image processing, and then is supplied to the head drive section 16. The image data supplied to the head drive section 16 is recorded by the recording head 17 as an image on a recording medium.

The recording head 17 comprises four recording heads each corresponding to C (Cyan), M (Magenta), Y (Yellow), and K (Black). The recording heads 17 of these colors are arranged parallel.

Figure 2:
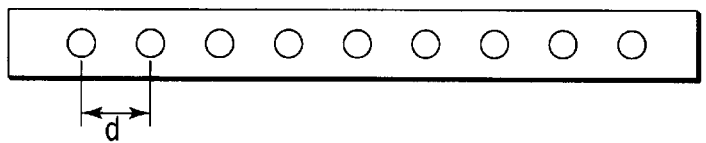
FIG. 2 shows an arrangement of nozzles for each color's recording head according to the embodiment.

As shown in FIG. 2, the recording head 17 of each color has many ejection nozzles arranged on an orifice plate with a fine interval, say, 1/300 inches.

Figure 3:
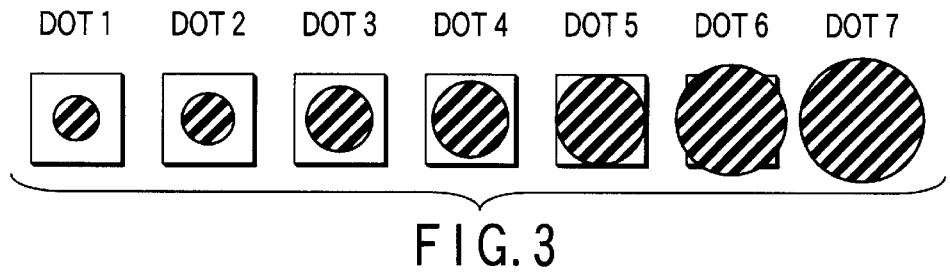
FIG. 3 shows output dot sizes according to the embodiment.

The color image generation apparatus 12 provides an intended gradation by varying sizes of dots ejected from an ejection nozzle of the recording head 17 onto a recording medium as shown in FIG. 3.

The color image generation apparatus 12 moves the recording head 17 for each color in a horizontal scanning direction and a recording medium in a vertical scanning direction. An image data signal is used for selecting one of the recording heads corresponding to C, M, Y, and K. The selected recording head's ejection nozzle ejects ink of the corresponding color at a specified timing to record ink dots of that color on a recording medium.

Figure 4:
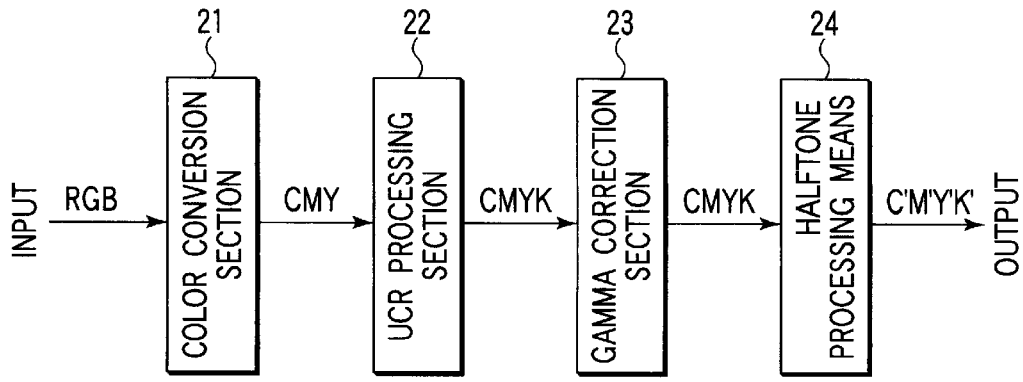
FIG. 4 is a block diagram showing a configuration example of an image processing means according to the embodiment.

FIG. 4 shows an example of the image processing function executed by an image processing program stored in the ROM 14. This image processing means comprises a color conversion section 21, a UCR processing section 22, a gamma correction section 23, and halftone processing means 24.

The image processing means first uses the color conversion section 21 to convert, say, an 8-bit RGB color signal standardized for a monitor to corresponding colors C, M, and Y reproduced on a printer. Then, the UCR processing section 22 extracts an achromatic component from the CMY colors, determines subsequent CMY colors, and finally converts these colors to CMYK colors.

The image processing means then uses the gamma correction section 23 to perform a density correction corresponding to an actual output characteristic on a printer. The halftone processing means 24 converts 1-pixel data for each color to multi-level image data C', M', Y', and K'. The multi-level image data has a fewer gradations with each color comprising 2 to 4 bits in compliance with the color image generation apparatus 12's throughput.

The color image generation apparatus 12 makes each color's dot size variable and represents a gradation by recording a chromatic color dot and an achromatic color dot at almost the same position. In this case, small-size dots are very frequently recorded for representing a highlighted portion. This increases a frequency of generating a void region between recorded dots.

Figure 5:
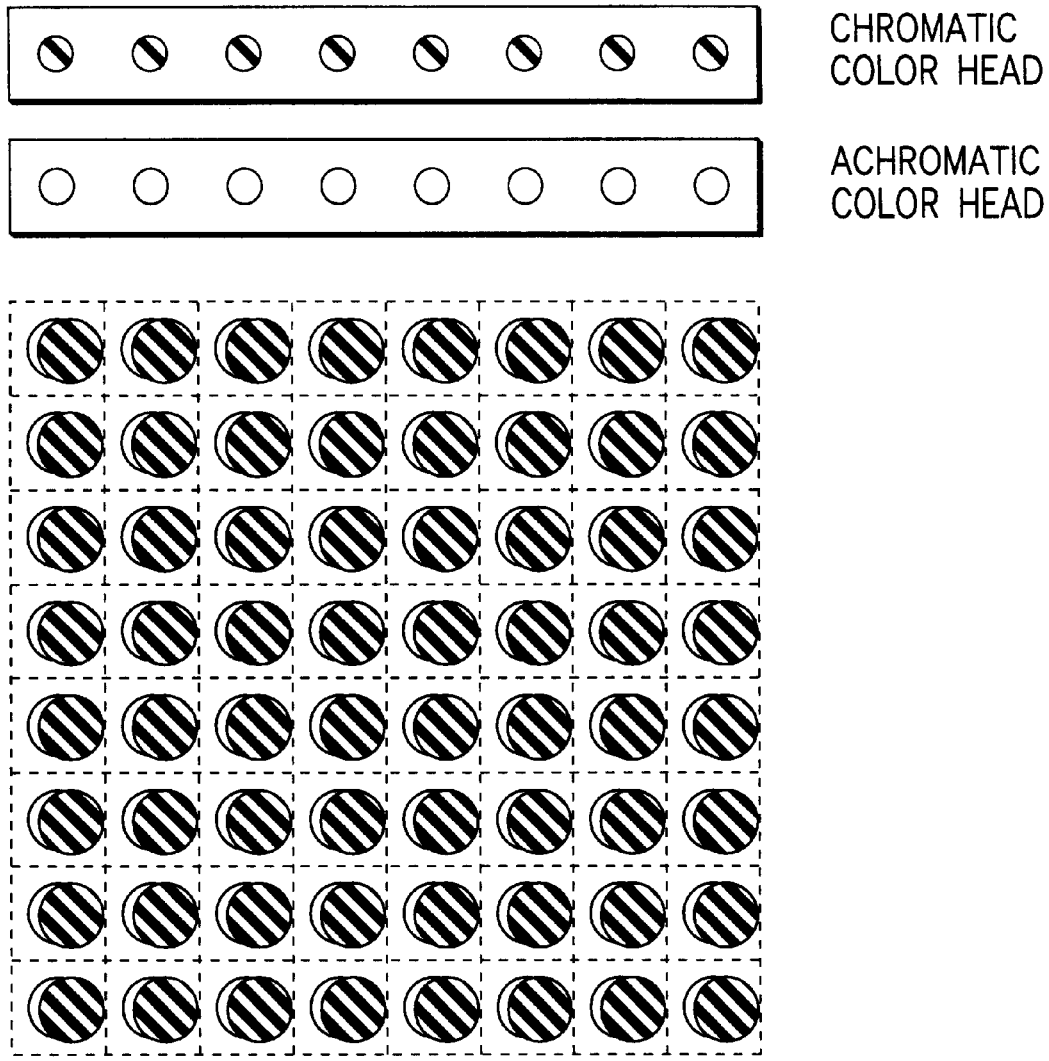
FIG. 5 is an explanatory drawing showing that the embodiment eliminates a color change by recording chromatic color dots and achromatic color dots on accurate positions.
Figure 6:
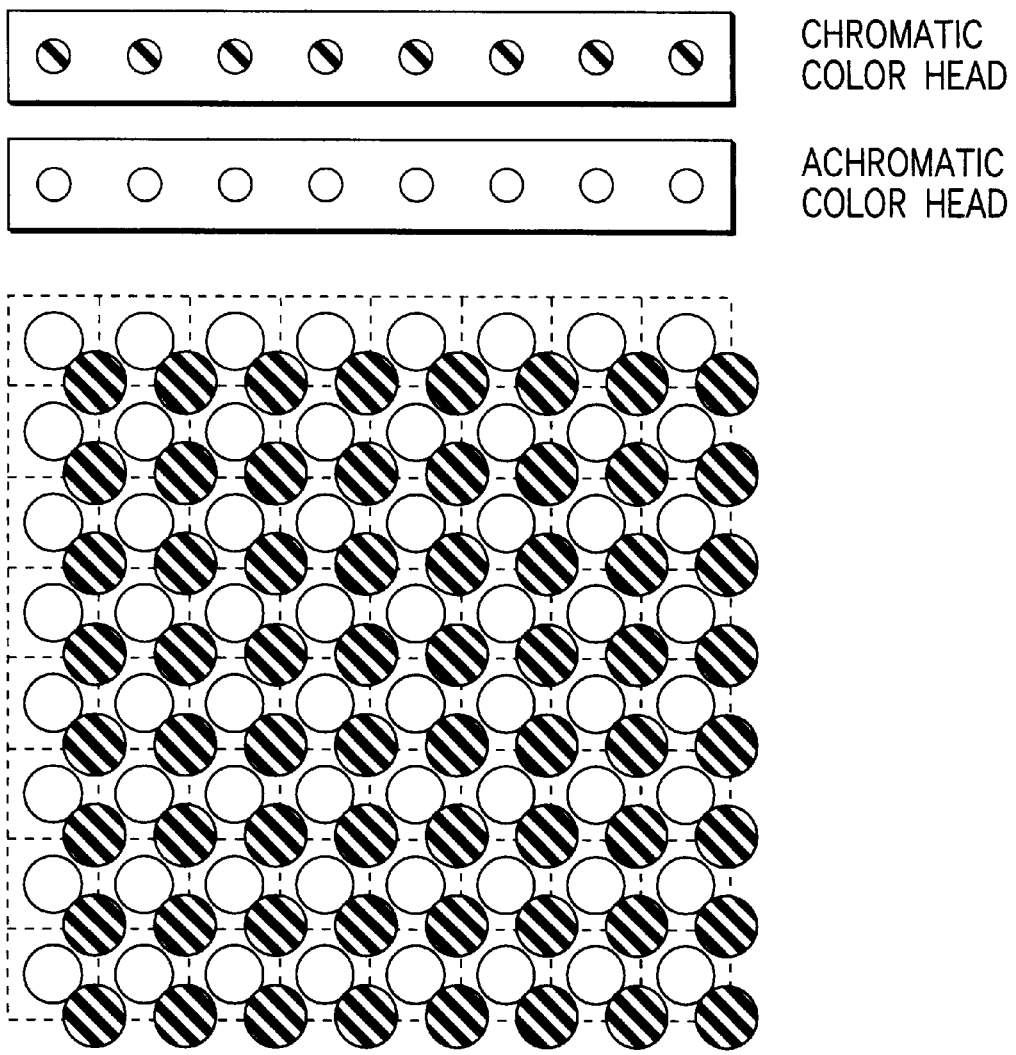
FIG. 6 is an explanatory drawing showing that the embodiment enlarges a color change by recording chromatic color dots and achromatic color dots on inaccurate positions.

In such a situation, a color change occurs when a chromatic color dot from a chromatic color head and an achromatic color dot from an achromatic color head are recorded on accurate positions as shown in FIG. 5 and when a chromatic color dot from the chromatic color head is recorded on an inaccurate position and a chromatic color dot is recorded on a void region as shown in FIG. 6.

A color change also occurs when a chromatic color dot from a chromatic color head and an achromatic color dot from an achromatic color head are recorded on accurate positions and when an achromatic color dot from the achromatic color head is recorded on an inaccurate position and an achromatic color dot is recorded on a void region.

A color change is hardly identifiable visually when only dots of chromatic colors such as C, M, and Y are recorded. However, a color change becomes more identifiable visually when chromatic colors and an achromatic color, namely a K dot, are recorded compared to the case where only chromatic colors are recorded.

Figure 7:
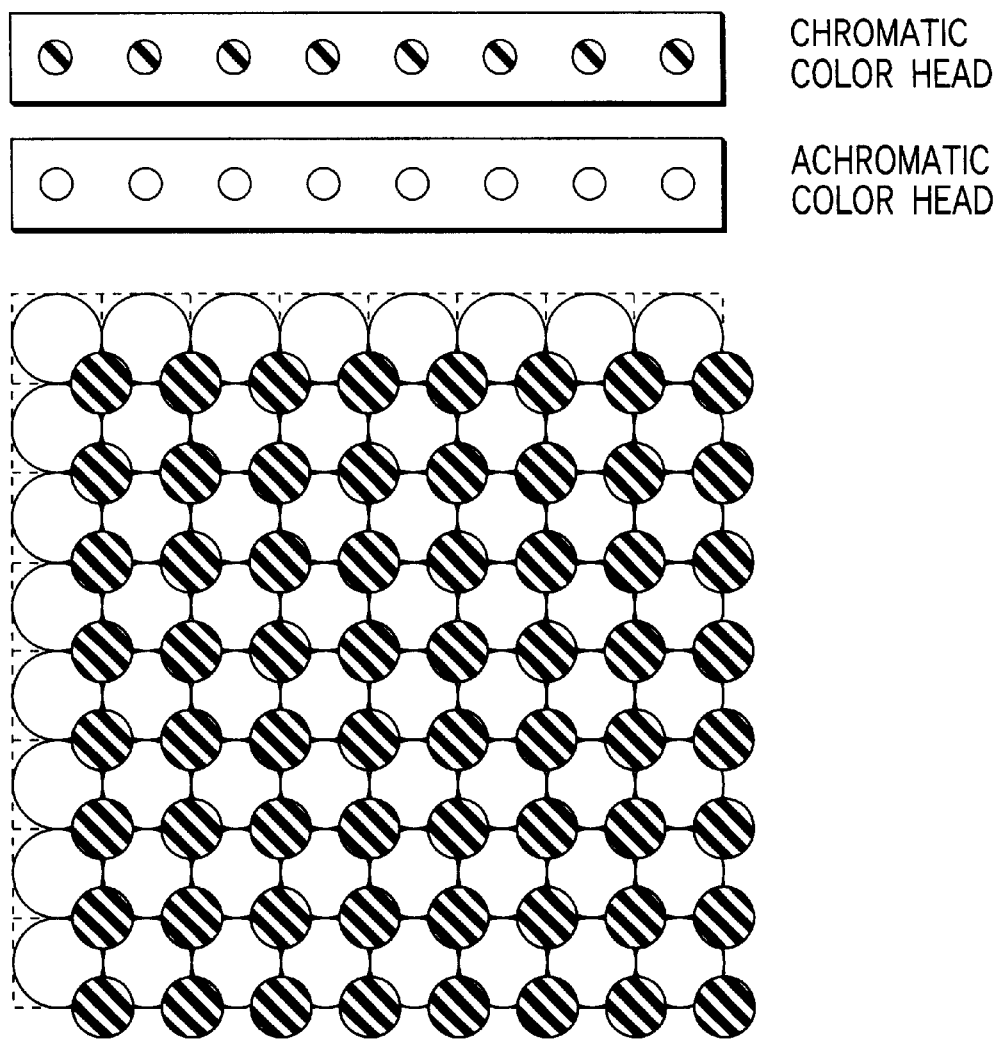
FIG. 7 is an explanatory drawing showing that the embodiment decreases a color change by making the sum of dot diameters greater than a specified value when chromatic color dots and achromatic color dots are recorded on inaccurate positions.

Even if a dot is recorded on an inaccurate position, it is possible to decrease a color change by increasing a diameter of an achromatic color dot to be recorded to decrease void regions as shown in FIG. 7.

When a chromatic color dot and an achromatic color dot are recorded at almost the same position, there are many combinations for maintaining input color information because the achromatic color dot is a redundant component.

In these combinations, there is a combination which causes the sum of chromatic and achromatic color dot diameters to be greater than a specified value. Selecting such a combination prevents a color change even if a dot is recorded at a position shifted from the specified recording position.

In the above description, the specified value indicates a threshold value for the sum of chromatic and achromatic color dot diameters in order to satisfy a color change amount which prevents a color change from being identified visually or keeps a color change, if identified, within an allowable range.

In addition, maintaining the input color information refers to an output by changing a dot diameter without changing the color itself.

Even if a dot is recorded at an inaccurate position, a color change can be decreased by increasing a dot area to be recorded and decreasing a recording area as shown in FIG. 7.

When a chromatic color and an achromatic color are recorded at almost the same position, there are many combinations for maintaining the input color information because the achromatic color dot is a redundant component.

Among these, there is a combination in which the sum of chromatic and achromatic color dot areas is greater than or equal to a specified value. Selecting such a combination suppresses a color change even if the dot recording position shifts from a specified position. In the above description, the specified value indicates a threshold value for the sum of chromatic and achromatic color dot areas in order to satisfy a color change amount which prevents a color change from being identified visually or keeps a color change, if identified, within an allowable range.

In addition, maintaining the input color information refers to an output by changing a dot area without changing the color itself.

Figure 8:
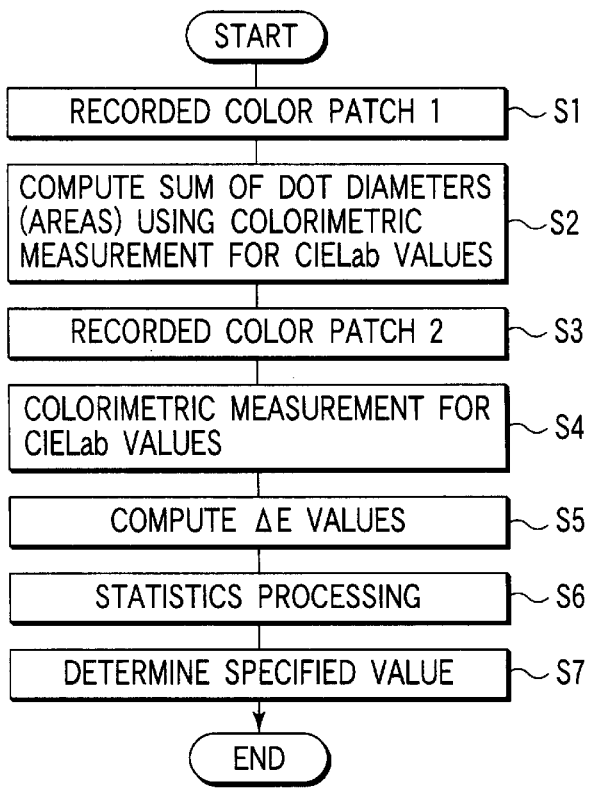
FIG. 8 is a flowchart showing a procedure of determining a specified value for the sum of dot diameters or the sum of areas according to the embodiment.

FIG. 8 is a flowchart showing a procedure of determining the above-mentioned specified value. The following describes an example of a color image generation apparatus using four colors C, M, Y, and K.

The color image generation apparatus forms an image by recording dots and relatively transporting a recording medium in a direction orthogonal to a direction of a recording head comprising many recording elements. The recording medium used here is commercially available ink-jet print paper. The ink is made of organic pigment dispersed in main solvent such as petroleum solvent through the use of a dispersing agent. The ink viscosity is 10mPas (Pascal·sec) at room temperature. This color image generation apparatus has a multi-level capability for expressing gradation by repeatedly recording dots per pixel.

The color image generation apparatus is used for evaluation. It is possible to fine adjust dot sizes to be recorded and relative positions of each color head.

The color image generation apparatus can record seven combinations of chromatic and achromatic colors for dots, namely C+K, M+K, Y+K, C+M+K, M+Y+K, C+Y+K, and C+M+Y+K.

Figure 9:
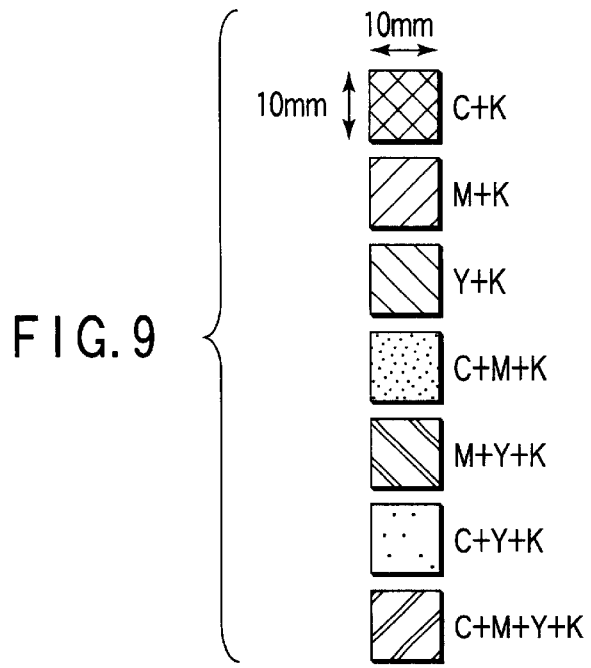
FIG. 9 is a schematic diagram of color patches used for determining a specified value for the sum of dot diameters or the sum of areas according to the embodiment.

Step S1:

Step 1 records color patches as shown in FIG. 9 on a recording medium by variously changing diameters or areas chromatic and achromatic color dots. These color patches correspond to the seven combinations of chromatic and achromatic colors. Here, chromatic and achromatic color dots to be recorded need to be adjusted so that they are recorded at the positions in FIG. 5.

Step S2:

Step S2 performs colorimetric measurement for CIELab values of the color patches recorded at step S1. The colorimetric measurement uses an X-Rite938 Spectrodensitometer, a light source D50, and a cut filter 8 mmUV.

The sum of color dot diameters or areas for each color patch is computed beforehand according to the corresponding data acquired using a dot analyzer DA-5000S manufactured by Oji Scientific Instruments Ltd.

Step S3:

Step S3 records equivalent color patches at Step S1 on a recording medium in a state wherein chromatic and achromatic color dots are adjusted to be recorded at a position in FIG. 6. The position in FIG. 6 refers to a position which causes a maximum color change amount.

Step S4:

Step S4 performs colorimetric measurement for CIELab values of the color patches recorded at step S3. Like step S2, the colorimetric measurement uses an X-Rite938 Spectrodensitometer, a light source D50, and a cut filter 8 mmUV.

Step S5:

Step S5 uses equation 1 below to compute value ΔE indicating a color change from CIELab values for the color patches based on the colorimetric measurement at steps S2 and S4.

$$\Delta E = \sqrt{(L_0^* - L_1^*)^2 + (a_0^* - a_1^*)^2 + (b_0^* - b_1^*)^2}$$

$L^*_0, a^*_0, b^*_0$: CIELab values found at step S2
$L^*_1, a^*_1, b^*_1$: CIELab values found at step S4

Step S6:

Step S6 measures a correlation between the sum of color patch dot diameters or areas found at step S2 and ΔE found at step S5.

Figure 10A:
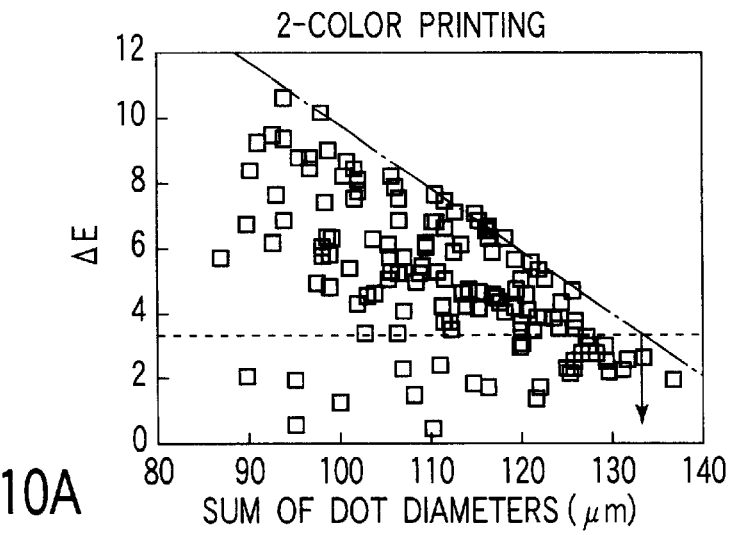
FIGS. 10A to 10C show correlations between the sum of dot diameters and a value ΔE indicating a color change amount according to the embodiment.
Figure 10B:
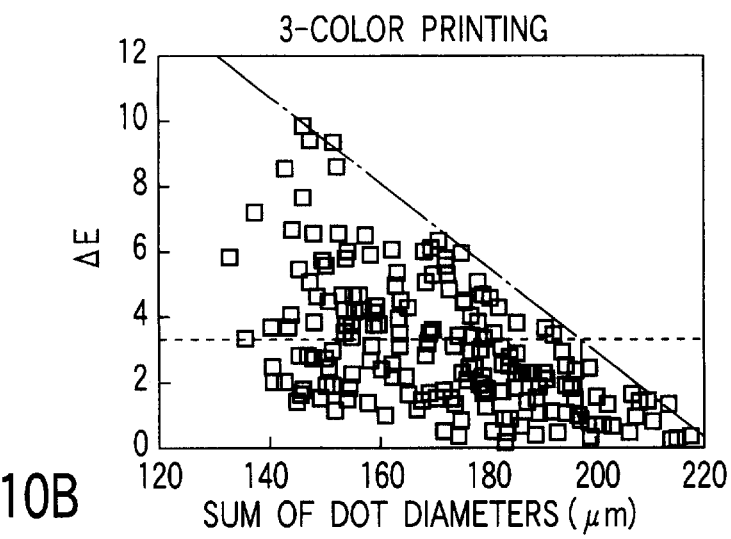
Figure 10C:
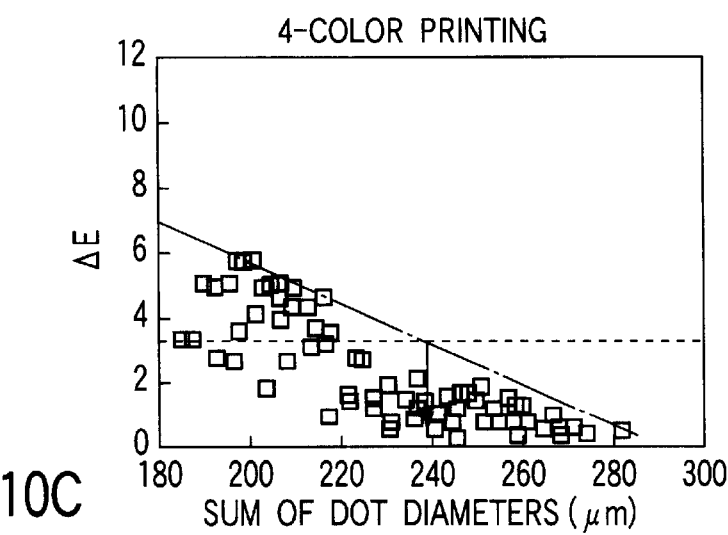
Figure 11A:
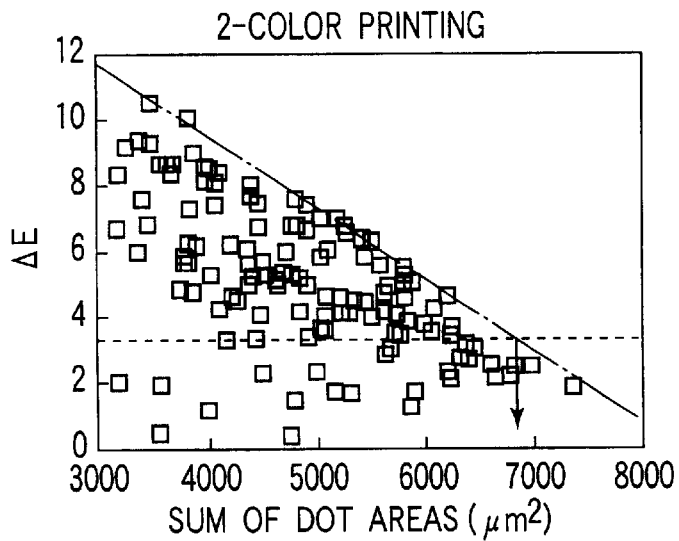
FIGS. 11A to 11C show the correlations between the sum of dot areas and a value ΔE indicating a color change amount according to the embodiment.
Figure 11B:
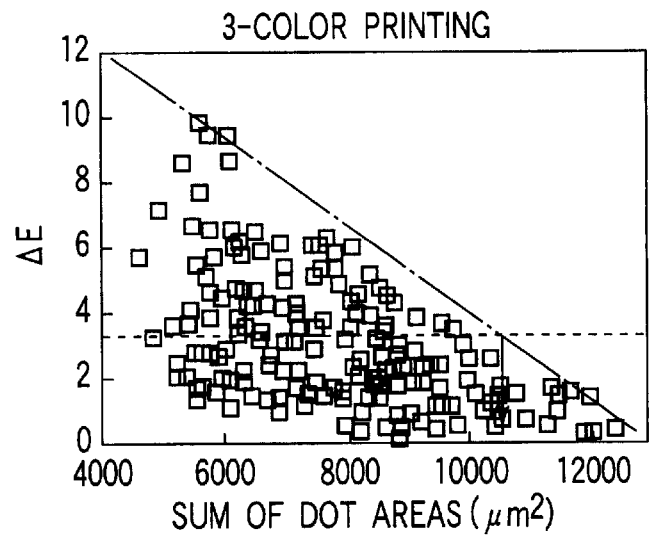
Figure 11C:
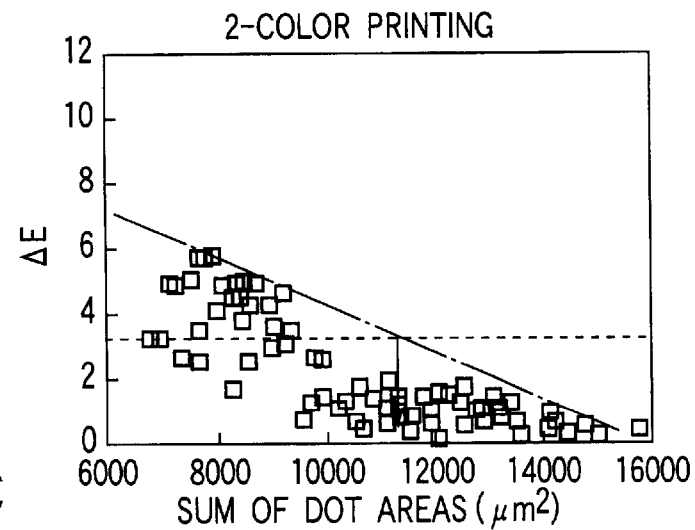

FIGS. 10A to 10C show correlations between the sum of dot diameters and ΔE. FIGS. 11A to 11C show correlations between the sum of dot areas and ΔE. The correlation is measured for each printing.

FIGS. 10A and 11A depict ΔE output results for 2-color printing, namely C+K and M+K. FIGS. 10B and 11B depict ΔE output results for 3-color printing, namely C+M+K, M+Y+K, and C+Y+K. FIGS. 10C and 11C depict ΔE output results for 4-color printing, namely C+Y+M+K. FIGS. 10A to 11C indicate that ΔE decreases as the sum of dot diameters or areas increases.

Step S7:

According to the correlation found at step S6, step S7 sets a threshold value ΔEth for the color change amount ΔE and extracts data below the threshold value ΔEth. The threshold value ΔEth depends on an allowable color change amount.

Specified values used in FIGS. 10A to 11C are found from the last extracted data. The threshold value ΔEth for ΔE is assumed to be 3.

Table 1 below lists specified values actually found from FIGS. 10A to 11C.

TABLE 1

| Parameter | Number of Colors | Specified Value |
|---|---|---|
| Sum of Dot Diameters | 2 | 133 (μm) |
| Sum of Dot Diameters | 3 | 200 (μm) |
| Sum of Dot Diameters | 4 | 240 (μm) |
| Sum of Dot Areas | 2 | 7000 (μm$^2$) |
| Sum of Dot Areas | 3 | 10500 (μm$^2$) |
| Sum of Dot Areas | 4 | 11500 (μm$^2$) |

A color change is suppressed by recording dots wherein the sum of chromatic and achromatic color dot diameters or areas is greater than or equal to the specified value as found above. Table 1 above indicates that specified values depend on the number of colors to be recorded.

Accordingly, it is possible to properly decrease a color change by setting or adjusting the specified value corresponding to the number of colors to be recorded.

The following describes image processing means for converting an input color signal to a chromatic color signal and an achromatic color signal.

When an input color signal is converted to a chromatic color signal and an achromatic color signal, this means that the input color signal such as RGB or CMY is converted to a signal containing an achromatic color such as K in CMYK.

As an example, the image processing means determines a UCR (under color removal) ratio by using chromatic and achromatic color dot diameters or areas and converts a color signal input on the basis of this UCR ratio to a chromatic color signal and an achromatic color signal.

In other words, the image processing means converts a color signal input on the basis of the UCR ratio to a chromatic color signal and an achromatic color signal. Generally, this image processing means refers to UCR processing.

Figure 12A:
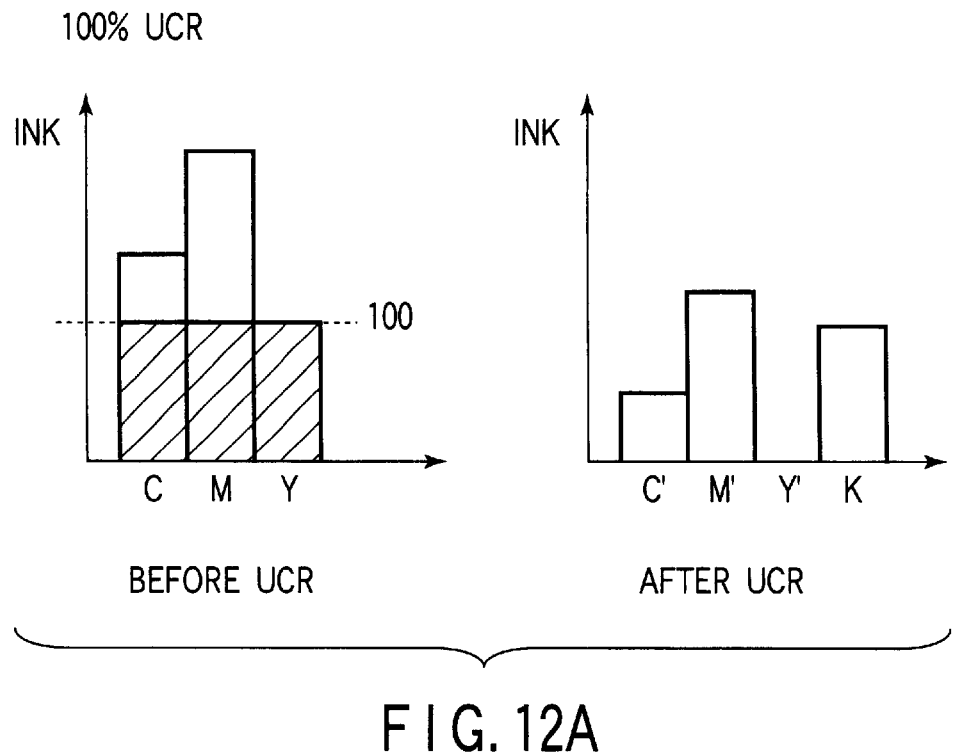
FIGS. 12A and 12B show general UCR (under color removal) processing.
Figure 12B:
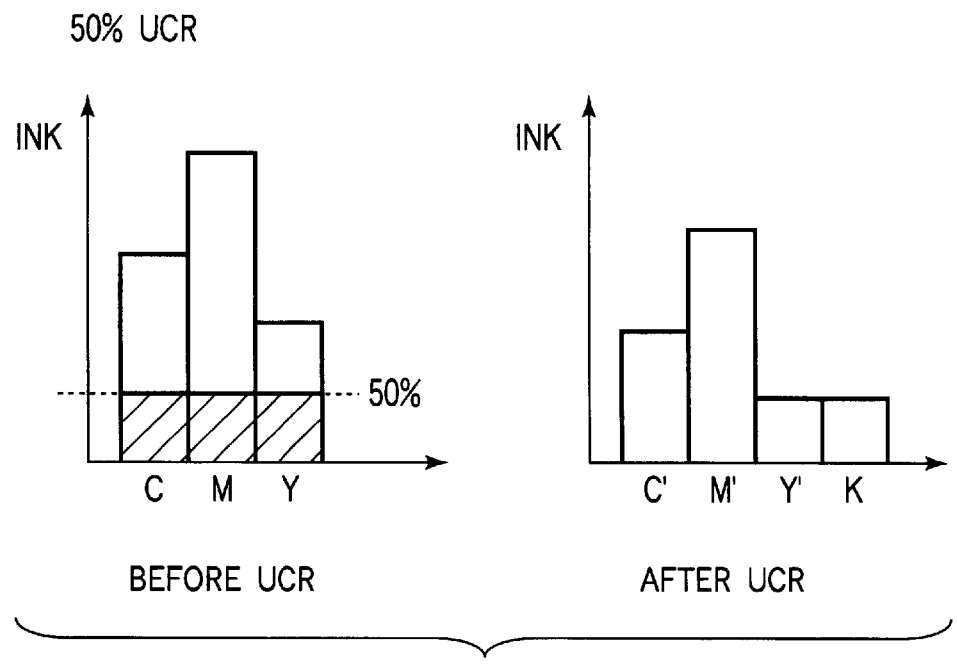

As shown in FIGS. 12A and 12B, the UCR processing comprises UCR (under color removal) and achromatic component generation processing. The UCR operation removes common components from input C, M, and Y data. The achromatic component generation processing replaces the removed components with K data. An example of the UCR processing is expressed with the following equations.

$$C'=C-\alpha\times\min(C,M,Y)$$

$$M'=M-\alpha\times\min(C,M,Y)$$

$$Y'=Y-\alpha\times\min(C,M,Y)$$

$$K=\alpha\times\min(C,M,Y)$$

In these equations, C, M, and Y are input color signals. C', M', Y', and K are chromatic color signals and an achromatic color signal after the UCR processing. The value min(C, M, Y) is a minimum input color signal value. The value α is a UCR ratio.

FIG. 12A shows an example of UCR ratio 100%. This is equivalent to setting α=1 in the above equations.

FIG. 12B shows an example of UCR ratio 50%. This is equivalent to setting α=0.5 in the above equations.

The following describes how to determine a UCR ratio using chromatic and achromatic color dot diameters or areas.

The color image generation apparatus forms an image by recording dots of C, M, Y, and K colors and relatively transporting a recording medium in a direction orthogonal to a direction of a recording head comprising many recording elements. This color image generation apparatus used generates a pixel by overwriting dots up to seven times. The recording medium used here is commercially available ink-jet print paper. The ink is made of organic pigment dispersed in main solvent such as petroleum solvent through the use of a dispersing agent. The ink viscosity is 10mPas (Pascal. sec) at room temperature. A dot analyzer DA-5000S manufactured by Oji Scientific Instruments Ltd. is used to measure dot diameters or areas for expressing eight gradations of each color on this color image generation apparatus. Tables 2 and 3 show the measurement results.

TABLE 2

| Gradation | 0 | 1 | 2 | 3 | 4 | 5 | 6 | 7 |
|---|---|---|---|---|---|---|---|---|
| C | 0 | 64.51 | 78.99 | 92.57 | 106.8 | 111.4 | 120.3 | 130.7 |
| M | 0 | 57.55 | 76.96 | 84.85 | 98.39 | 108.3 | 116.8 | 120.6 |
| Y | 0 | 65.79 | 83.39 | 92.11 | 107.6 | 114.7 | 123.9 | 130.9 |
| K | 0 | 62.36 | 77.21 | 88.07 | 99.98 | 109.1 | 119.5 | 125.8 |

※ Unit: μm

TABLE 3

| Gradation | 0 | 1 | 2 | 3 | 4 | 5 | 6 | 7 |
|---|---|---|---|---|---|---|---|---|
| C | 0 | 3268 | 4900 | 6731 | 8951 | 9742 | 11370 | 13423 |
| M | 0 | 2601 | 4651 | 5655 | 7602 | 9211 | 10707 | 11422 |
| Y | 0 | 3400 | 5461 | 6664 | 9085 | 10331 | 12066 | 13449 |
| K | 0 | 3054 | 4682 | 6092 | 7850 | 9349 | 11221 | 12427 |

※ Unit: μm$^2$

Figure 13:
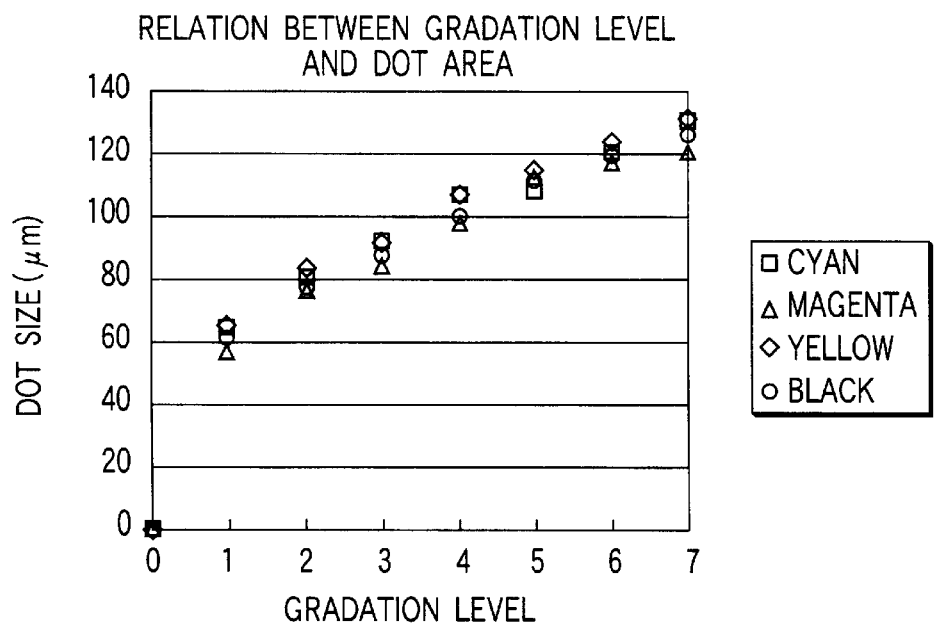
FIG. 13 shows the relation between a gradation level and a dot diameter according to the embodiment.
Figure 14:
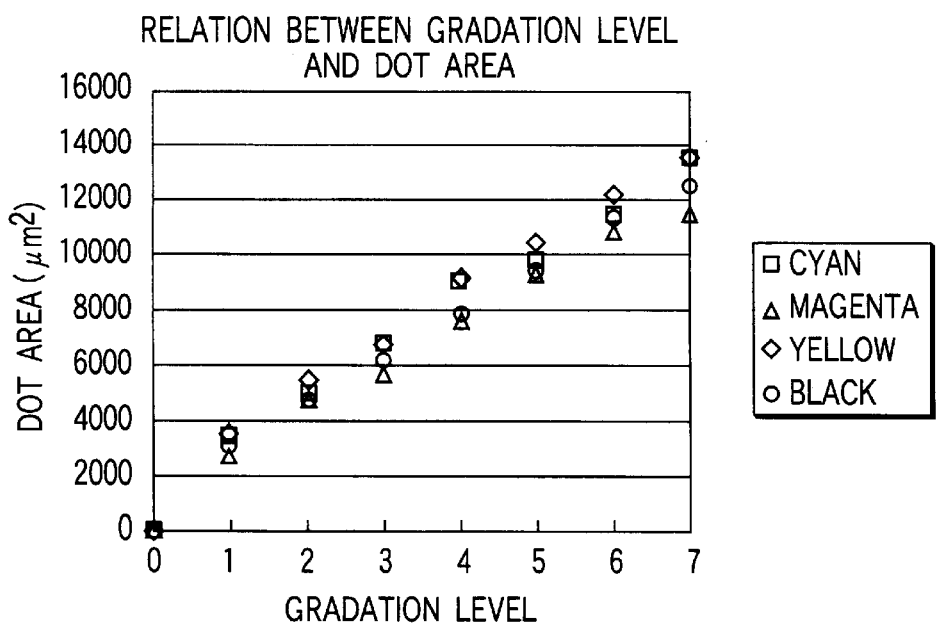
FIG. 14 shows the relation between a gradation level and a dot area according to the embodiment.

FIGS. 13 and 14 graph these results.

Assuming that dot diameters or areas for output image signals C', M', Y', and K are DC=fc(C'), Dm=fm(M'), Dy=fy(Y'), and Dk=fk(K), dot diameters or areas for input image signals C, M, and Y are found as follows.

$$Dc=fc(C-\alpha\times\min(C,M,Y))$$

$$Dm=fm(M-\alpha\times\min(C,M,Y))$$

$$Dy=fy(Y-\alpha\times\min(C,M,Y))$$

$$Dk=fk(\alpha\times\min(C,M,Y))$$

The sum of dot diameters or areas is Dc+Dm+Dy+Dk. This value is used for finding a which allows the sum of dot diameters or areas to be greater than or equal to the above-mentioned specified value.

FIGS. 15 and 16 show results of UCR ratios actually computed by using the above equations.

FIG. 15 shows UCR ratios computed according to the sum of dot diameters. FIG. 16 shows UCR ratios computed according to the sum of dot areas. In either case, a highlight portion is set to the UCR ratio 0%. Namely, no achromatic color dots are recorded. The UCR ratio gradually increases toward a shadow portion.

It is possible to keep a color change amount smaller than or equal to the allowable value by performing the UCR processing using these UCR ratios.

There is a plurality of combinations of chromatic and achromatic color dots for reproducing an input color signal. From these, there is extracted a combination of chromatic and achromatic color dots wherein the sum of chromatic and achromatic color dot diameters or areas is greater than or equal to a specified value. From the extracted combinations, it is necessary to record a combination of chromatic and achromatic color dots wherein an achromatic color dot diameter or area is minimum or maximum. To do this, the following describes image processing means for converting an input color signal to a chromatic color signal and an achromatic color signal.

Figure 17:
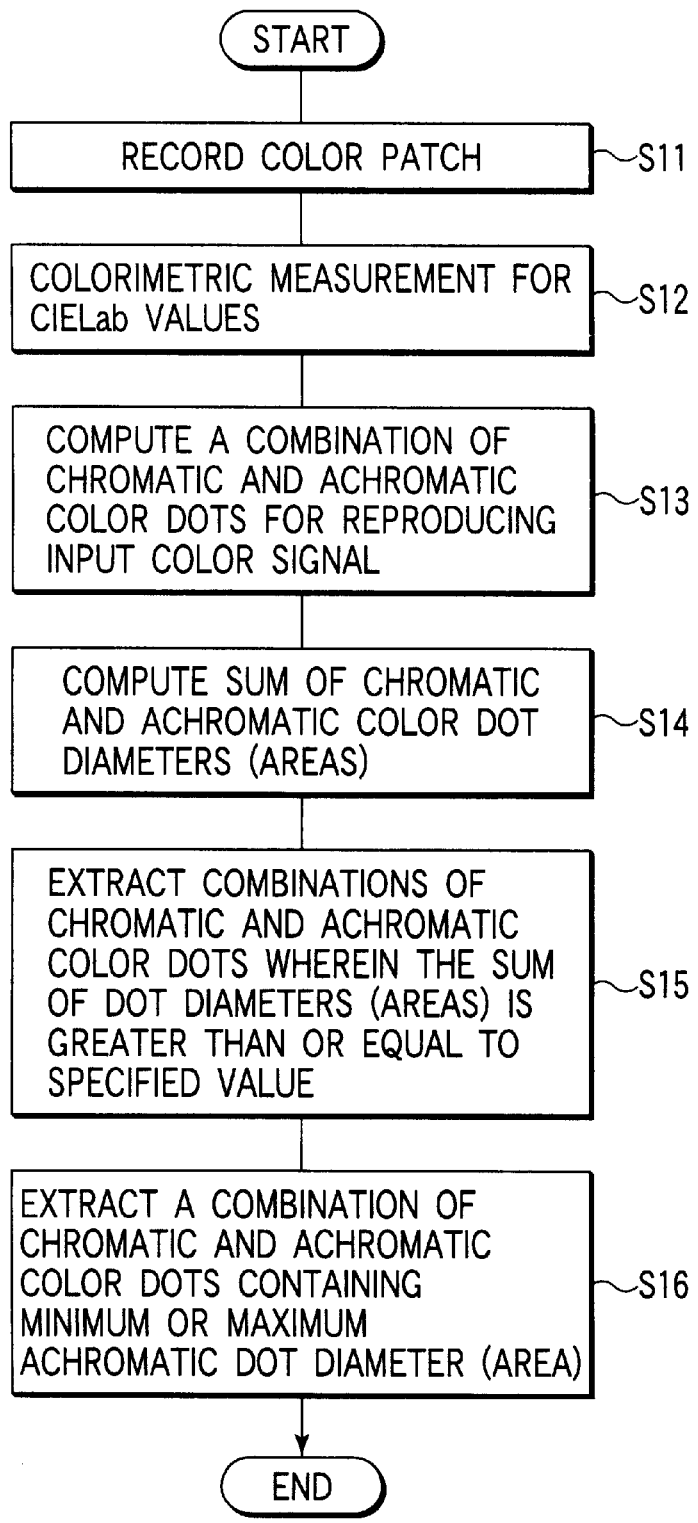
FIG. 17 is a flowchart showing a procedure for converting an input color signal to a chromatic color signal and an achromatic color signal for recording chromatic and achromatic color dots reproducing this input color signal according to the embodiment.

FIG. 17 is a flowchart showing a procedure for converting an input color signal to a chromatic color signal and an achromatic color signal for recording chromatic and achromatic color dots reproducing this input color signal.

Step S11:

Step S11 uses the color image generation apparatus to record color patches comprising many combinations of chromatic and achromatic color dots.

Step S12:

Step S12 performs colorimetric measurement for CIELab values of the color patches recorded at step S11.

Step S13:

Step S13 computes a combination of chromatic and achromatic color dots reproducing the input color signal (equivalent to a CIELab value) based on the colorimetric measurement result found at step S12. There may be a plurality of combinations of chromatic and achromatic color dots to be computed.

Step S14:

Step S14 finds the sum of dot diameters or areas for the computed chromatic and achromatic color dots.

Step S15:

Step S15 extracts combinations of chromatic and achromatic color dots wherein the sum of dot diameters or areas found at step S14 for chromatic and achromatic color dots is greater than or equal to a specified value. Here, the specified value is equivalent to the sum of dot diameters or areas for chromatic and achromatic color dots wherein the color change amount is smaller than or equal to an allowable value.

Step S16:

From the combinations of chromatic and achromatic color dots extracted at step S15, step S16 further extracts chromatic and achromatic color signals for recording a combination of chromatic and achromatic color dots which provides the minimum or maximum achromatic color dot diameter or area. The extracted chromatic and achromatic color signals are determined to be color signals for reproducing the input color signal.

Step S16 yields the combination of chromatic and achromatic color dots for minimizing an achromatic color dot diameter or area. This combination provides the maximum sum of chromatic and achromatic color dot diameters or areas among the extracted combinations.

In this case, a color change is suppressed as the sum of chromatic and achromatic color dot diameters or areas increases. Namely, it is possible to perform image processing with a color change further more suppressed.

By contrast, step S16 shows the combination of chromatic and achromatic color dots which provides the maximum achromatic color dot diameter or area. This combination provides the minimum sum of chromatic and achromatic color dot diameters or areas among the extracted combinations.

In this case, there may be the maximum color change in th e extracted chromatic and achromatic color dots. Since the sum of chromatic and achromatic color dot diameters or areas is greater than or equal to the specified value, the color change amount remains in an allowable range. Further in this case, the maximum achromatic color dot is available, forming images with good contrast.

Figure 18A:
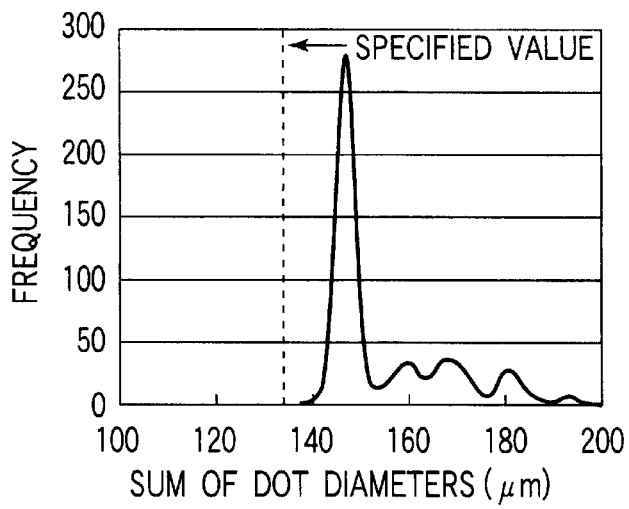
FIGS. 18A to 18C provide histograms showing sums of dot diameters for chromatic and achromatic colors recorded according to the embodiment.
Figure 18B:
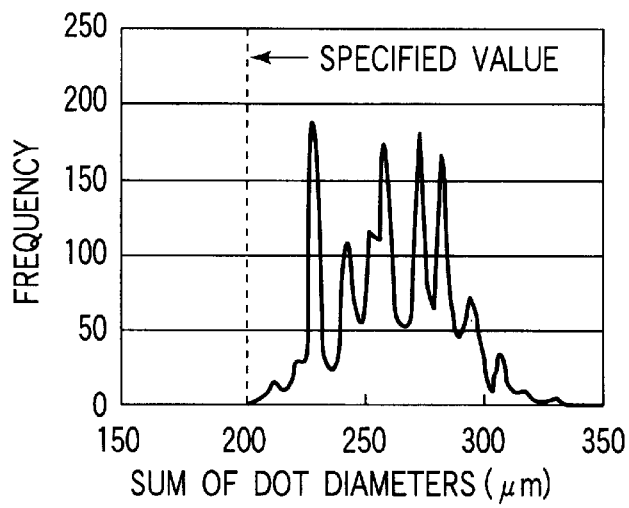
Figure 18C:
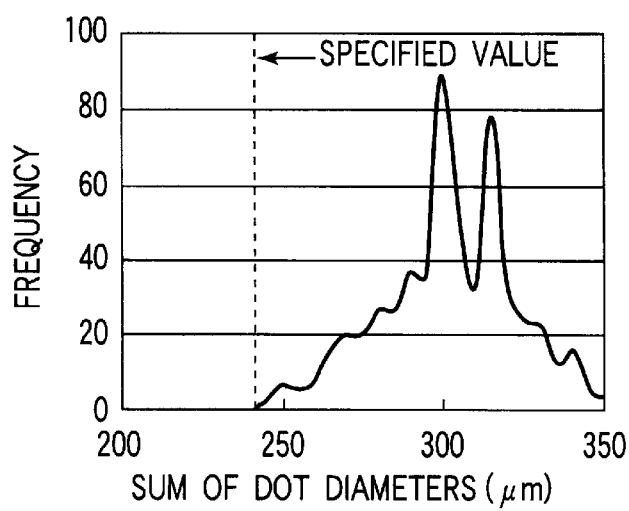

FIGS. 18A to 18C explain image generation results using histograms which show sums of dot diameters for chromatic and achromatic colors recorded with the color image generation apparatus. The color image generation apparatus used records dots on a recording medium using recording heads for C, M, Y, and K colors. Each head comprises many recording elements arranged thereon. The apparatus used generates a pixel by overwriting dots up to seven times.

An input image comprises a combination of 32 dots for input color signals R, G, and B, namely $32^3=32,768$ points.

The image processing means as shown in FIG. 4 converts this input image to chromatic and achromatic color signals. Then, the gamma correction section 23 and the halftone processing means 24 perform image processing to convert these signals to 8-gradation image data.

The 8-gradation image data is made correspond to dot diameters in Table 1 for presenting the eight gradations already measured for each color. FIGS. 18A to 18C provide histograms for sums of chromatic and achromatic color dot diameters.

FIG. 18A shows a histogram for the sum of chromatic and achromatic color dots when recording two colors (one chromatic color and one achromatic color). FIG. 18B shows a histogram for the sum of chromatic and achromatic color dots when recording three colors (two chromatic colors and one achromatic color). FIG. 18C shows a histogram for the sum of chromatic and achromatic color dots when recording four colors (three chromatic colors and one achromatic color).

In all cases, the sum of dot diameters is greater than or equal to the specified value: 133 $\mu$m for 2-color recording, 200 $\mu$m for 3-color recording, or 240 $\mu$m for 4-color recording. Namely, the color change amount is maintained to the allowable value or below.

Theoretically, color changes should be decreased by accurate manufacturing in order to prevent a color change due to inconsistent nozzle accuracies resulting from a manufacturing process for a recording head of the color image generation apparatus or relative misalignment between recording heads. However, this increases a manufacturing cost.

From this viewpoint, the embodiment of the present invention uses the image processing means to provide measures against a color change, generating color images with decreased color changes without additional costs.

The color image generation apparatus according to this embodiment is applicable to ink-jet, thermal-transfer, electrophotographic systems, and the like.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A color image generation apparatus for recording dots by using chromatic and achromatic color materials and expressing gradations by changing respective color dot sizes, comprising:

image processing means which, when the chromatic and achromatic color dots are each recorded at almost the same position, converts and reproduces an input color signal and processes the input color signal so that the sum of respective dot diameters is greater than a preset specified value.

2. The color image generation apparatus according to claim 1, wherein said image processing means determines a UCR ratio using diameters of chromatic and achromatic color dots to be recorded and converts a color signal input based on the determined UCR ratio to a chromatic color signal and an achromatic color signal.

3. The color image generation apparatus according to claim 1, wherein said image processing means converts an input color signal to chromatic and achromatic color signals to extract combinations of chromatic and achromatic color dots wherein the sum of chromatic and achromatic color dot diameters is greater than a specified value out of a plurality of combinations of chromatic and achromatic color dots for reproducing an input color signal, and to record a combination of chromatic and achromatic color dots containing the minimum achromatic color dot diameter out of the extracted combinations of chromatic and achromatic color dots.

4. The color image generation apparatus according to claim 1, wherein said image processing means converts an input color signal to chromatic and achromatic color signals for extracting combinations of chromatic and achromatic color dots wherein the sum of chromatic and achromatic color dot diameters is greater than a specified value out of a plurality of combinations of chromatic and achromatic color dots for reproducing an input color signal, and to record a combination of chromatic and achromatic color dots containing the maximum achromatic color dot diameter out of the extracted combinations of chromatic and achromatic color dots.

5. A color image generation apparatus for recording dots by using chromatic and achromatic color materials and expressing gradations by changing respective color dot sizes, comprising:

image processing means which, when the chromatic and achromatic color dots are each recorded at almost the same position, converts and reproduces an input color signal and processes the input color signal so that the sum of respective dot diameters is greater than or equal to a preset specified value, wherein said image processing means vary a preset specified value according to the number of colors to be recorded.

6. The color image generation apparatus according to claim 5, wherein said image processing means determines a UCR ratio using diameters of chromatic and achromatic color dots to be recorded and converts a color signal input based on the determined UCR ratio to a chromatic color signal and an achromatic color signal.

7. The color image generation apparatus according to claim 5, wherein said image processing means converts an input color signal to chromatic and achromatic color signals to extract combinations of chromatic and achromatic color dots wherein the sum of chromatic and achromatic color dot diameters is greater than or equal to a specified value out of a plurality of combinations of chromatic and achromatic color dots for reproducing an input color signal, and to record a combination of chromatic and achromatic color dots containing the minimum achromatic color dot diameter out of the extracted combinations of chromatic and achromatic color dots.

8. The color image generation apparatus according to claim 5, wherein said image processing means converts an input color signal to chromatic and achromatic color signals for extracting combinations of chromatic and achromatic color dots wherein the sum of chromatic and achromatic color dot diameters is greater than or equal to a specified value out of a plurality of combinations of chromatic and achromatic color dots for reproducing an input color signal, and to record a combination of chromatic and achromatic color dots containing the maximum achromatic color dot diameter out of the extracted combinations of chromatic and achromatic color dots.

9. A color image generating method of converting and reproducing an input color signal and performing processing so that the sum of respective color dot diameters is greater than a preset specified value when chromatic and achromatic color materials are used for recording dots, gradation being expressed by changing color dot sizes, and said chromatic and achromatic color dots are recorded at almost the same position.

* * * * *